Patented Oct. 14, 1952

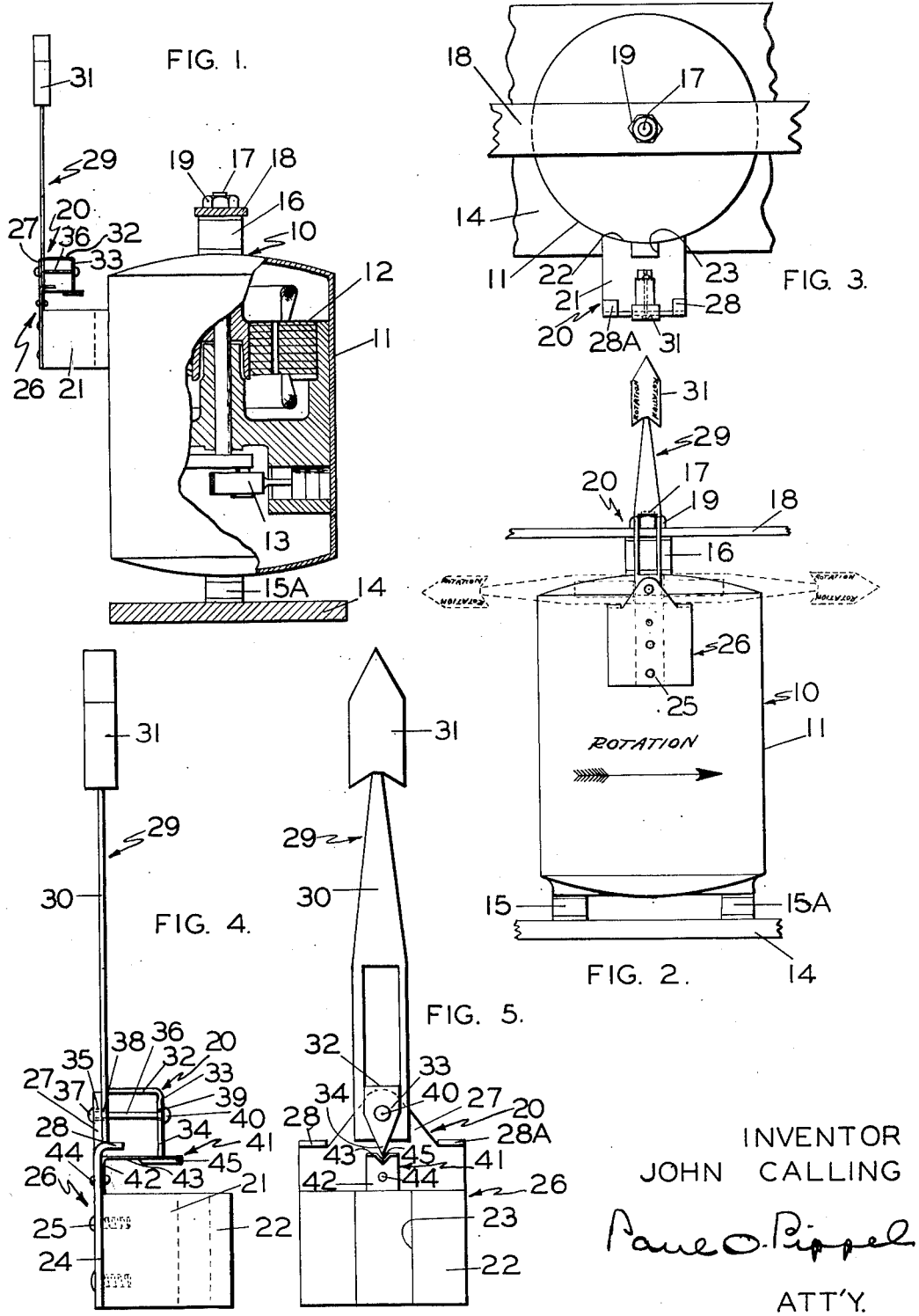

2,613,628

UNITED STATES PATENT OFFICE 2,613,628

ROTATION INDICATOR FOR HERMETICALLY SEALED MOTOR COMPRESSOR UNITS

John Calling, Evansville, Ind., assignor to International Harvester Company, a corporation of New Jersey Application May 11, 1951, Serial No. 225,779

4 Claims. (Cl. 116—115)

This invention relates to servicemen's testing apparatus of the type suitable for determining the direction of rotation of a rotative element operating within a sealed casing. More specifically, however, it is directed to a directional indicator adapted for indicating direction of rotation of the rotative element in a hermetically sealed motor-compressor unit of the type employed with refrigeration apparatus.

The conventional hermetically sealed motor-compressor unit employed for compressing refrigerant in a refrigerating system is usually equipped with a lubricating pump that supplies oil under pressure to the bearings of the unit. Such lubricating pumps have been found to be more dependable, and more economical to construct, when fashioned to operate in only one direction; hence it is appreciated that the direction of rotation of the compressor-motor in devices of this character is highly critical to the most efficient operation thereof.

In a motor-compressor unit provided with a single phase electric driving motor there is, of course, no problem because the direction of rotation of the motor will always be the same and the lubricating oil pump will follow accordingly. In a unit equipped for operation on a three-phase electrical power supply circuit, however, the problem is quite different. When such a unit is initially connected to the power supply it is very easy for the serviceman or the installer to transpose two of the three wires of the electrical circuit and thus connect the electric motor therein so that it will operate in a direction reverse to that for which the oil pump was designed. When this happens the motor-compressor will, of course, operate to compress and distribute refrigerant through the system but the bearings thereof will not receive their proper lubrication and, if the unit is allowed to operate for any appreciable length of time in this manner, such operation would inevitably result in severe damage to the bearings. From the exterior of a unit of this character it is not possible to readily determine the direction of rotation of the motor within the unit; hence any error in direction of rotation would not ordinarily be detected until the bearings failed for lack of oil.

In order to provide the equipment installer or serviceman with some simple means for overcoming difficulties of this character, and to avoid the repetition thereof in event repairs necessitating disconnection of the power supply lines have to be made at another time, the present invention was developed. Accordingly, it is the principal object hereof, to provide a simple, inexpensive and readily portable device, adapted for temporary and removable affixment to the interior of a resiliently mounted hermetically sealed motor-compressor unit, that operates to provide an exterior visual indication of the direction of rotation of the electric motor enclosed within said unit.

Another object is to provide a mechanically operated and exteriorly discernible means for readily determining the direction of rotation of the driving motor in a resiliently mounted hermetically sealed refrigerant motor-compressor unit.

A further object is to provide an exteriorly attachable means adapted for affixment to the casing of a resiliently mounted hermetically sealed motor-compressor unit for indicating direction of rotation of the rotatable elements of the driving motor therewithin.

An additional object is to provide a rotational direction indicator, attachable by magnetic means to the exterior casing of a resiliently mounted hermetically sealed motor-compressor unit, for indicating direction of rotation of the driving motor therein upon energization by a source of electric power.

A still further object is to provide inertia operated indicator means, temporarily attachable to the exterior of a resiliently mounted hermetically sealed motor-compressor unit, that is operable upon energization of the electrical circuit of the driving motor of said unit for indicating the direction of rotation of said motor.

A yet still further object is to provide in a resiliently mounted device having a sealed casing and a rotational element operating within said casing a mechanically operated and exteriorly discernible means for readily determining the direction of rotation of said rotative element.

The foregoing and other objects and features of the invention will become apparent as the disclosure is more fully made in the following detailed description of a preferred embodiment of the invention as illustrated in the accompanying sheets of drawings in which:

Fig. 1 is a side elevation, with a portion of the outer casing cut away to show generally the interior thereof, of a resiliently mounted hermetically sealed motor-compressor unit upon which the proposed rotational direction indicator has been affixed.

Fig. 2 is a front elevation of a hermetically sealed motor-compressor unit upon which the proposed rotational direction indicator has been affixed. Additional operative positions of the indicator have been shown in broken lines.

Fig. 3 is a top plan view of the unit shown in Fig. 2.

Fig. 4 is a side elevation, in enlarged detail, of the proposed rotational direction indicator.

Fig. 5 is a rear elevation of the proposed indicator.

In a preferred application of one embodiment of the present invention, as illustrated in the accompanying drawings, it will be noted that a conventional hermetically sealed motor-compressor unit, indicated by the numeral 10, has been shown as comprising an outer casing 11 enclosing an electric driving motor indicated generally by the numeral 12, and a refrigerant compressor 13 coupled to the motor for rotation therewith. The details of construction of the interior of the motor-compressor unit have not been shown in elaborate detail because any one of many well-known conventional units of this character may be so used, and, furthermore, the details thereof are not important to the basic concept of the present invention.

The motor-compressor unit is resiliently mounted and arranged, preferably, so that the entire unit may rotate within controlled limits about a vertical axis through the center thereof. While any suitable resilient mounting may be used the embodiment illustrated includes a base member 14, fashioned as a portion of the cabinet (not shown) with which such a unit is usually associated, and a pair of mounting blocks 15 and 15a, fashioned from some highly resilient material such as rubber or the like, secured thereto by any suitable means and upon which said unit may be positioned. Affixed to the top portion of the casing 11, of said motor-compressor unit, is a resilient mounting block member 16 the opposite face of which has a threaded stud or bolt 17 projecting therefrom and which may be fixedly positioned or anchored in said block member by any suitable means that will prevent its ready withdrawal therefrom. This block member, likewise, is fashioned, preferably, from some highly resilient material, such as rubber or the like, and is bonded or otherwise suitably secured to the casing 11. A transversely disposed bracket member 18, fashioned usualy as a part of the cabinet structure (not shown) in which such motor-compressor unit is ordinarily located, is positioned directly above the casing 11, and so arranged that the stud bolt 17 passes therethrough and is fixedly held therein by suitable means such as the nut 19. As thus positioned one end of the casing of said motor-compressor unit rests on the resilient blocks 15 and 15a, while the opposite end thereof is resiliently affixed to the mounting bracket 18 thereby permitting a limited amount of controlled rotational movement of said unit about the central vertical axis thereof.

Now in accordance with the specific teachings of this invention there is provided a rotational direction indicator that is readily adapted for attachment to and removal from the exterior casing of a resiliently mounted rotational device, such as a refrigerant motor-compressor or the like, for the purpose of visually determining the direction of rotation of a rotative element operating interiorly thereof. The indicator, as illustrated and represented generally by the numeral 20, is fashioned, preferably, with a highly magnetized base member 21 having one face 22 thereof slightly concave and provided with a longitudinal slot 23. The opposite face 24 of said base has affixed thereto by suitable means, such as the screws 25, a flat bracket member 26 having a triangularly-shaped extension 27 on one end thereof. Upwardly extending projections on one end of said bracket are bent downwardly to form flange-like stops or abutments 28 and 28a, respectively, on opposite edges thereof, for limiting rotation or deflection of the indicating member to be hereinafter described.

Pivotally affixed to the triangular extension of said bracket is a pointer or indicating arm, represented generally by the numeral 29, which, as illustrated in Figs. 4 and 5, is fashioned substantially as shown with a tapering stem portion 30 and an arrow head pointer or marker 31 on one end thereof. One end of the stem has a section, preferably punched out from material in the central portion thereof, that is bent outwardly and then downwardly to form a pivoting support bracket 32, and a depending extension 33 having a point on the end thereof to provide a detent 34. The front face of the marker may have the word "Rotation" printed thereon as indicated in Fig. 2.

The indicating arm 29 may be pivotally affixed to the bracket 26 by any suitable means but one preferred embodiment of such an affixing means is best illustrated in Figs. 4 and 5. An opening 35, in the triangular extension 27 of said bracket, has a stud 36 positioned therein and is held from withdrawal therethrough by the head 37. Aligned openings 38 and 39 in the indicating arm stem 30 and the depending extension 33, respectively, are provided to receive the stud 36 in pivotal relation. A head 40 may be rolled on the outer end of said stud after the indicator arm has been pivotally positioned thereover.

An angled bracket-like spring holding member 41, having a vertical arm 42 from which extends a horizontal arm 43, is affixed, by any suitable means such as the rivet 44, below and in vertical alignment with the pivotal axes of said indicator arm, to the bracket 26. The upper face of the horizontal arm 43 is provided with a substantially V-shaped recess 45 that extends inwardly from the free end thereof and said arm is so arranged that the recess may receive and hold the detent 34 when the indicator arm 29 is disposed in an upright position. The holding or retaining member 41 is fashioned, preferably, from any suitable semi-resilient material, such, for instance, as spring steel, that will be sufficiently flexible to permit the horizontal arm 43 thereof to be depressed downwardly, by the action of the detent 34 as it rotates within the recess 45, but still return to a normal position of rest after said detent has been removed from the recess.

In order to operate the proposed indicating device the concaved face 22 of the indicator base is positioned against the outer metallic casing 11, preferably adjacent the dome of the resiliently mounted motor-compressor unit, and while said unit is inoperative, and held thereagainst by the magnetic action of said magnetized base. The indicating arm is next positioned to point upright with the detent 34 engaging the recess 45 in the spring retaining member 41 and the device is then ready for operation. When the electrical power is connected to the electric motor in said unit the initial inrush of electrical energy into the motor windings causes the rotor to twist or rotate in one direction about its own rotative axes, while the stator of said motor, which is fixedly secured to the unit's casing, will tend to twist in the opposite direction and thus slightly rotate the casing together with the indicator affixed thereto in the same direction about the same vertical axes. As the indicator moves with the casing, the inertia lag of the pointer or indicating arm will tend to oppose this rotational thrust and try to retain the arrowhead marker in its original vertical position. However, as the indicator moves with the casing the pivotal axes of the indicator arm, which passes through the stud 36, is displaced and rotated out of vertical alignment with the center of mass of the arm, located proximate the arrowhead marker. Such displacement causes the indicator arm, which is held in a balancing position only by the light spring retaining member 41 pressing against the detent 34, to deflect or fall to that side of its vertical axes which is opposite that of the direction of rotation of the casing. However, since the direction of rotation of the rotor is the reverse of that taken by the stator and since the arrowmarker will fall or deflect in the direction opposite that of rotation of the stator it is evident that said marker will deflect so as to point in the direction of rotation of the rotor. In the conventional motor-compressor unit the proper direction of rotation for the rotor is usually indicated by an arrow and the word "Rotation" printed on the outside of the unit's casing; hence when the direction of this arrow indicator corresponds with that of the indicating arm arrow it will be certain that the unit is rotating in the direction for which it was designed. If these two indicators do not correspond then the electrical connections must be changed and the above checking procedure repeated. After the proper direction of rotation has been established the rotational indicator may be removed by placing some hand tool, such as a screw driver, in the slot 23 and prying the base member thereof away from the casing.

Although only a preferred form of the invention has been illustrated, and that form described in detail, it will be apparent to those skilled in the art that various modifications may be made therein without departing from the spirit of the invention or from the scope of the appended claims.

What is claimed is:

1. A serviceman's testing apparatus for translating limited rotative movement of the casing of a hermetically sealed and resiliently mounted mechanism into visual manifestation in order to determine direction of rotation of a rotating element adapted to rotate in either of two directions therewithin, comprising: a translatorial base adapted for movement with the mechanism casing; manifesting means, including an indicator arm adapted for indicating direction of rotation of an element rotating within the sealed mechanism; means for pivotally mounting said indicator arm on said base so that the pivotal axes of the arm is spaced a substantial distance from the center of mass of said arm; resilient retaining means arranged to engage the pivoted end portion of said indicator arm and support it in an upright position when the rotating element of the sealed mechanism is at rest; and magnetic means for temporarily attaching said base to the sealed casing whereby the limited rotative movement of the casing, resulting from the starting impulse of the rotating element therewithin, may be transmitted to the manifesting means to cause the arm thereof to be deflected to one side or the other in accordance with the direction of rotation of the rotating element within the casing.

2. A serviceman's testing apparatus for translating limited rotative movement of the casing of a resiliently mounted mechanism into visual manifestation in order to determine direction of rotation of a rotating element adapted to rotate clockwise or counterclockwise therewithin, comprising: a translatorially movable base adapted for movement with the mechanism casing; manifesting means, including an indicator arm fashioned with its center of mass proximate one end thereof, and adapted for indicating direction of rotation of an element rotating within the resiliently mounted mechanism; means for pivotally mounting said indicator arm on said base so that the pivotal axes of the arm is inwardly spaced from the end thereof that is farthest from the arm's center of mass; resilient retaining means arranged to engage the pivoted end portion of said indicator arm and retain it in an upright position when the rotating element of the mechanism is at rest; magnetic means for temporarily attaching said base to the mechanism casing, whereby the limited rotative movement of the casing may be transmitted to the manifesting means for effecting a displacement of the center of mass in the arm and thereby translate into a visual indication the direction of rotation of the rotating element within the mechanism.

3. An inertia operated direction of rotation indicator of the character adapted for association with a resiliently mounted mechanism having an exterior casing arranged for limited rotational movement and having a rotating element therewithin adapted for rotation in either one of two directions, comprising: a translatorial base member for transmitting the limited rotational movement of the resiliently mounted casing; manifesting means, including an indicator having an arrow-like pointer on one end thereof for indicating direction of rotation of a rotating element within the casing; means for pivotally mounting said manifesting means on said base, and having the pivotal axes of said manifesting means disposed proximate the end of said indicator farthest from said pointer; resilient means carried by said base and cooperating with the pivoted end portion of said indicator for maintaining said indicator pointer in an upright position when the rotating element of the resiliently mounted mechanism is at rest; and means for temporarily affixing said base to the casing whereby the limited rotative movement of the casing, resulting from the starting impulse of the rotating element therewithin, may be transmitted to said manifesting means to cause the indicator thereof to be deflected to one side or the other of the upright position in accordance with the direction of rotation of the rotating element within the casing.

4. An inertia operated rotational direction indicator of the type adapted for use with a resiliently mounted mechanism having an exterior casing arranged for limited rotative movement and having a rotating element therewithin adapted for rotation in either one of two directions comprising: a translatorial base member for transmitting the limited rotative movement of the resiliently mounted casing; manifesting means, including an indicator arm having an enlarged arrow-like pointer at one end thereof and a pivotal opening for journaling said arm proximate the opposite end thereof, for indicating direction of rotation of the rotating element within the casing; means cooperating with said journal opening for pivotally mounting said manifesting means on said base; indicator arm restraining means, including a detent member carried by said arm and pivotally mounted for movement therewith about the same axes as the arm and a resilient member carried by said base and having a notch therein that cooperates with said detent member for retaining said arm in an upright position when the rotating element is at rest; and means for removably affixing said base to the exterior of the casing whereby the limited rotative movement of the casing, resulting from the starting impulse of the rotative element therewithin, may be transmitted to said manifesting means to cause the indicator thereof to be deflected to one side or the other of the upright position in accordance with the direction of rotation of the rotating element within the casing.

JOHN CALLING.

REFERENCES CITED

The following references are of record in the file of this patent:

UNITED STATES PATENTS

| Number | Name | Date |
|---|---|---|
| 2,109,523 | Calhoun | Mar. 1, 1938 |
| 2,157,514 | Whipple | May 9, 1939 |